United States Patent [19]

Cherniak

[11] 4,407,325

[45] Oct. 4, 1983

[54] ARCUATE SWING CHECK VALVE

[76] Inventor: George S. Cherniak, 246 21st Pl., Santa Monica, Calif. 90402

[21] Appl. No.: 319,806

[22] Filed: Nov. 9, 1981

[51] Int. Cl.³ .............................................. F16K 15/03
[52] U.S. Cl. .................................... 137/514; 137/527; 137/527.8
[58] Field of Search ..................... 137/514, 527–527.8; 251/299

[56] References Cited

U.S. PATENT DOCUMENTS

| | | | |
|---|---|---|---|
| 385,292 | 6/1888 | Baltzley | 137/527.8 X |
| 1,000,719 | 8/1911 | Cram | 137/527.8 X |
| 1,926,759 | 9/1933 | Wallman | 137/527.8 X |
| 2,913,001 | 11/1959 | Maslow | 137/527.4 |
| 3,937,240 | 2/1976 | Nanny | 137/527.8 |
| 4,034,780 | 7/1977 | Horvath | 137/527.8 |

Primary Examiner—Robert G. Nilson

Attorney, Agent, or Firm—George N. Woodruff

[57] ABSTRACT

A check valve for controlling the flow of fluid in a conduit so that flow in one direction is unimpeded and flow in the opposite direction is prevented, providing in the open position, an unimpeded flow passage permitting the passage through the valve of material separators or cleaning tools. An arcuate, saddle shaped valve sealing element developed from a tubular member is pivotable 90 degrees from a closed position in engagement with a valve seat to an open position where the sealing element is in conformal configuration with the inner wall of the valve body presenting a free flow path with no obstruction to the passage of solid objects through the valve. All elements of the valve are formable from tubular elements, eliminating the need for special castings and reducing the machining required to fabricate a valve.

16 Claims, 9 Drawing Figures

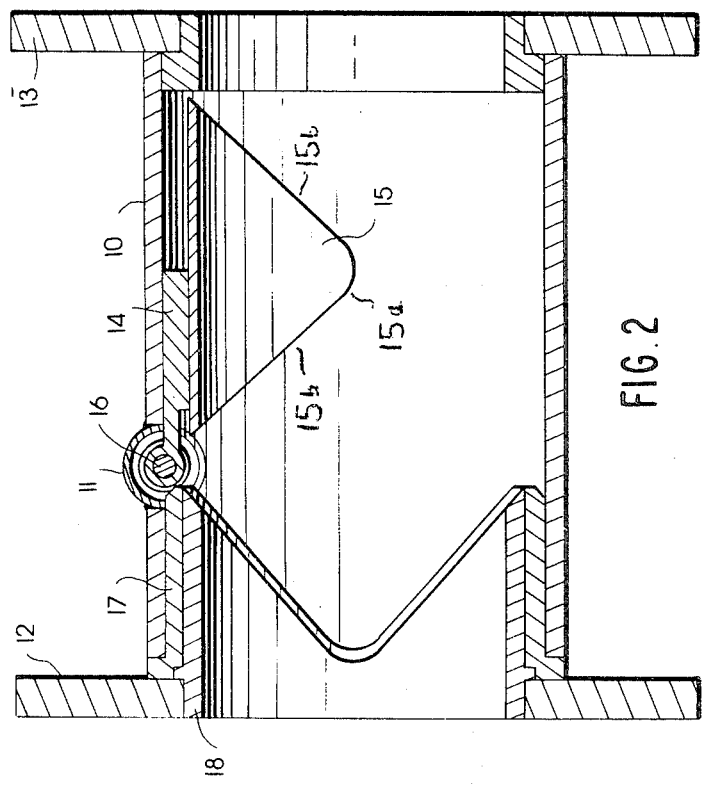
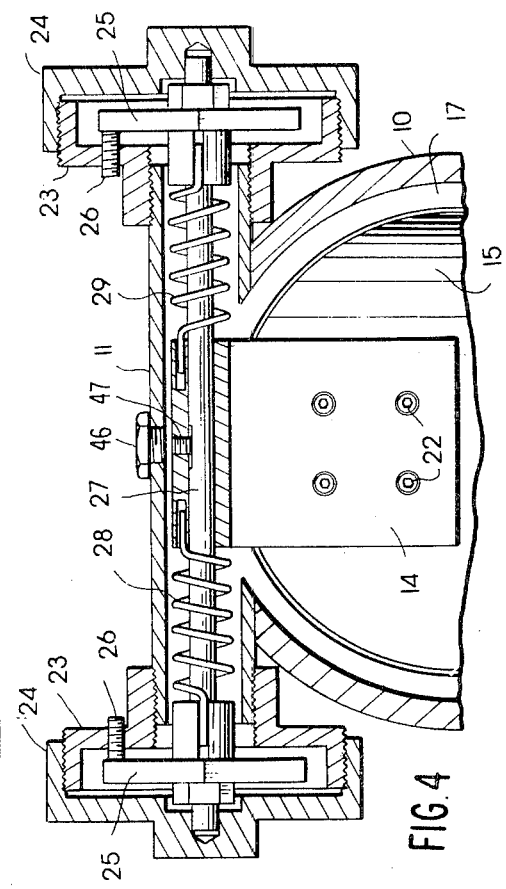
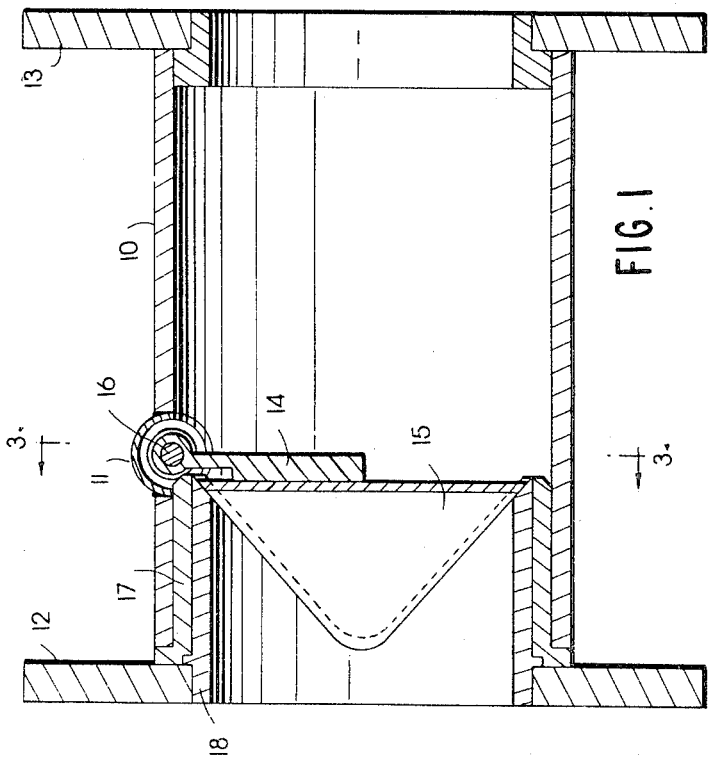
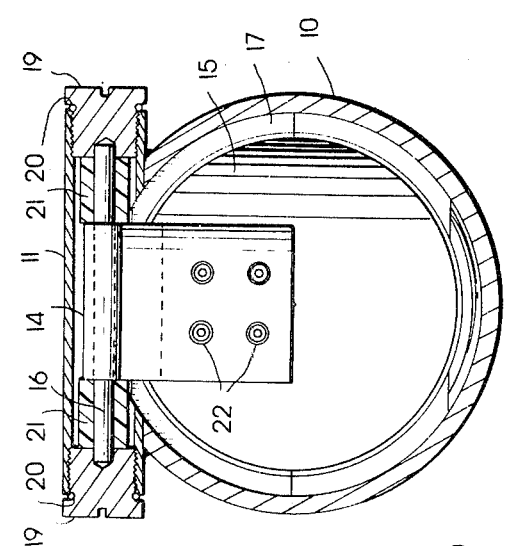

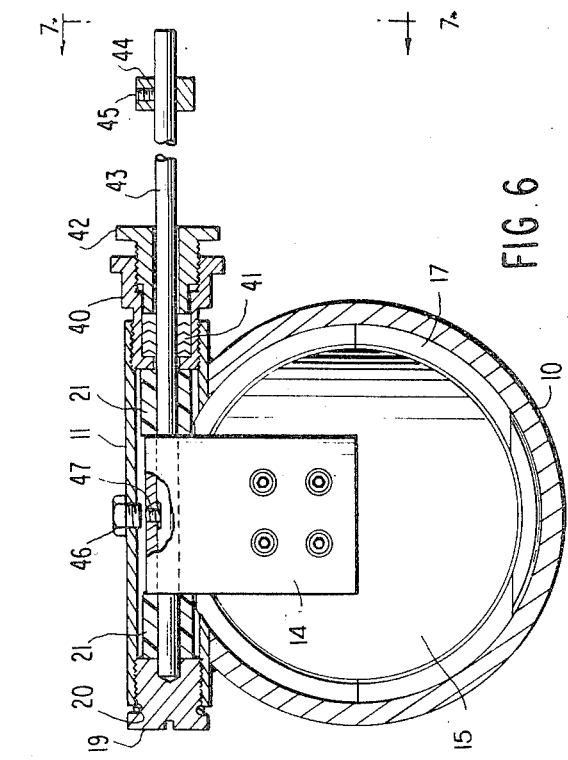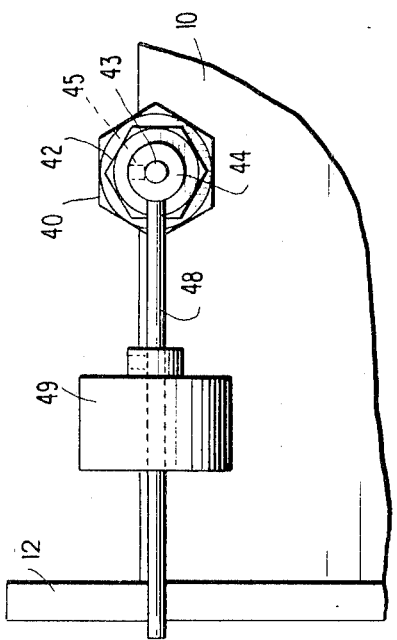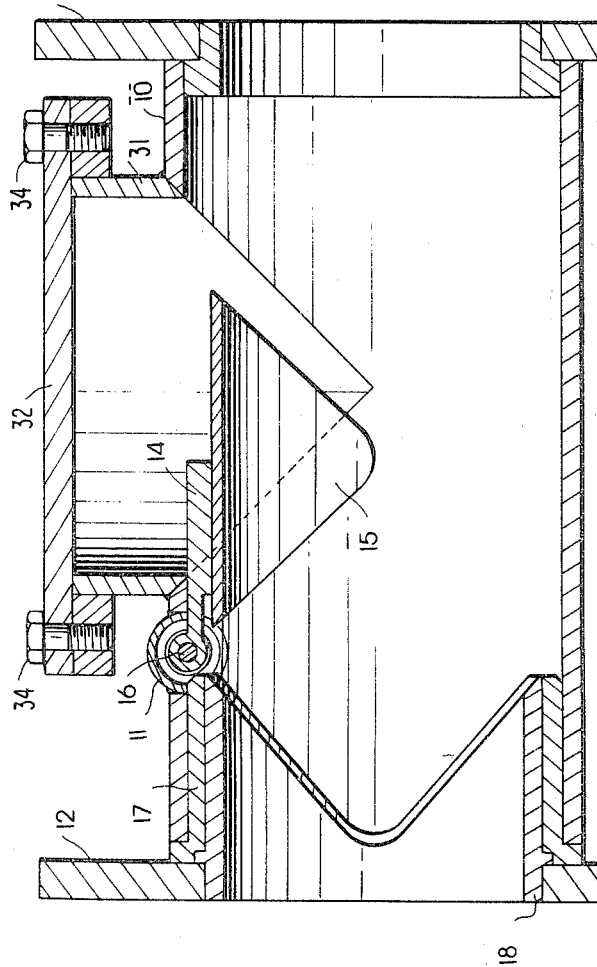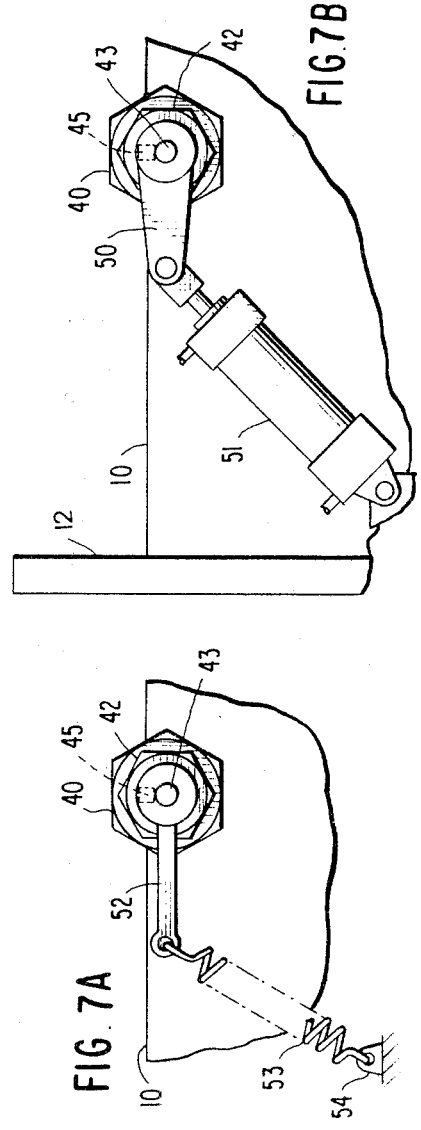

ARCUATE SWING CHECK VALVE

BACKGROUND OF THE INVENTION

Check valves are self-actuating devices used in fluid handling systems to permit free flow of the fluid in one direction and to prevent flow in the opposite direction. The basic elements of industrial check valves are a sealing member which may be a plate, disk, or poppet, hinged or supported in a valve body so that flow in one direction causes the sealing member to move away from a valve seat while flow in the opposite direction causes the sealing member to move against the valve seat, providing a flow tight seal. Springs may be provided to assist the sealing member to close on flow reversal and to maintain it in firm contact with the valve seat. Damping devices may be installed to prevent the valve from slamming closed when flow is suddenly reversed or chattering in the case of pulsating flow conditions.

Swing check valves in which a hinged sealing member or members are moved out of the fluid path by flow in the preferred direction and move back against a sealing surface when flow stops or reverses find widespread use in applications where cleaning tools or material separators must be passed through the line.

The most common type of swing check valve in general use is the flat plate type, typified by Wheatley, U.S. Pat. No. 3,334,652. A flat plate valve requires, however that a housing be provided for containing the plate when it is swung from the closed position to the open position resulting in a heavy, cumbersome structure when large diameter valves are involved.

A second form of swing check valves employs an arcuate member or members as the sealing elements. In the arcuate check valve the sealing element or elements have the same geometry as that of the fluid passage so that when swung out of the flow path the sealing element or elements lie on the interior wall of the fluid passage. Arcuate check valves may be of the split leaf type as shown in Noll, U.S. Pat. No. 586,618; Pranter, U.S. Pat. No. 2,956,582; Collar, U.S. Pat. No. 3,127,148 and Upham, U.S. Pat. No. 4,209,037 or of the single element type typified by Maslow, U.S. Pat. No. 2,913,001. A disadvantage of these valves, which the present invention seeks to overcome, is that, when closed, they are required to seal on planes both perpendicular and parallel to the direction of reverse fluid flow, complicating the problem of obtaining a leak proof seal.

In a previous application I disclosed an arcuate swing check valve having sealing surfaces developed by making intersecting 45 degree cuts to the axis of a tubular member, producing a valve seat having a 90 degree included angle. While this was an improvement on the prior art it proved difficult to obtain tight sealing at the apex of the seat, a condition which the present application seeks to remedy.

A first objective of this invention is to provide a check valve which, in the open position, has an unobstructed flow passage through the valve permitting the passage through the valve of cleaning tools or material separators.

Another objective of the present invention is to provide a valve which reduces turbulence within the valve to a practical limit, thus reducing pressure drop through the valve.

A further objective of this invention is to provide a check valve which can be simply fabricated from cylindrical sections of pipe or conduit without requiring castings and which significantly reduces the machining required to fabricate a check valve.

Still a further objective of this invention is to provide a check valve which reduces the overall size and weight of a valve to its practical and theoretical minimum.

And yet another objective of the present invention is to use the reverse flow, which closes the valve, to cause self alignment of the sealing member with respect to the valve seat so as to provide positive self alignment of the sealing member on the valve seat.

BRIEF SUMMARY OF THE INVENTION

This invention describes an arcuate swing check valve which overcomes several of the disadvantages of other swing check valves previously discussed. In the present invention an arcuate valve sealing member is developed by cutting a circular arc tangent to the horizontal diametral plane of a tubular member and extending tangential cuts from the arc to the periphery of the tubular member, meeting the surface of the tubular member at points on the vertical diametral plane spaced apart the diameter of the tubular member, using the portion removed as a sealing member. A mating valve seat is developed by cutting a circular arc through the horizontal diametral plane of a corresponding tubular member and extending tangential cuts from the arc to the transverse end plane of the member. When the arcuate valve sealing member is rotated 90 degrees from its position in engagement with the valve seat it has a conformal configuration with the inner wall of the tubular valve housing and presents no impediment to free flow of liquid through the valve in the preferred direction or to the free passage of cleaning tools or material separators through the valve.

An advantage of this development of valve seat and arcuate valve sealing member is that all elements of the valve are made from cylindrical members and castings for the valve body and other components are not required thus reducing the cost of fabrication of the valve and the weight of the finished valve.

BRIEF DESCRIPTION OF THE DRAWINGS

Referring now to the drawings wherein like numerals are employed to designate like parts throughout:

FIG. 1 is a vertical longitudinal section view of the valve in its closed position.

FIG. 2 is a vertical longitudinal section of the valve in its open position.

FIG. 3 is a transverse sectional view taken along the line 3—3 of FIG. 1.

FIG. 4 is a transverse sectional view of the valve with internal spring closure elements.

FIG. 5 is a vertical longitudinal section view of the valve provided with an access port.

FIG. 6 is a transverse sectional view of the valve with an external operating shaft.

FIG. 7A is a partial elevation view of the valve with external spring closure taken along the line 7—7 of FIG. 6.

FIG. 7B is a partial elevation view of the valve with external snubber means taken along the line 7—7 of FIG. 6.

FIG. 7C is a partial elevation view of the valve with an external counterweight taken along the line 7—7 of FIG. 6.

DETAILED DESCRIPTION OF THE INVENTION

In FIG. 1 there is shown a valve body 10 provided with a transverse pivot housing 11 and flanges 12 and 13 to permit the body to be connected to a fluid conduit or pipeline. A hinged arcuate valve sealing member 15 is supported within the body by hinge element 14 pivoting on pivot pin 16. In the closed position shown, arcuate valve sealing member 15 is engaged with valve seat 17 which is centered in valve body 10 by tubular element 18 extending axially beyond valve seat 17. In this position flow through the valve in the direction of from right to left is prevented.

Referring now to FIG. 2 the valve is shown in its open position with the arcuate valve sealing member 15 pivoted 90 degrees away from its former position and flow through the valve in the direction of from left to right is unimpeded and solid objects such as material separators or pipe cleaning tools may pass freely through the valve. The particular arcuate form of arcuate sealing member 15 may best be appreciated from this view. As may be seen sealing member 15 has a saddle shaped configuration developed by making a circular arc 15a tangent to the horizontal diametral plane of a tubular member and then extending tangential surfaces 15b from the circular arc 15a to the periphery of the tubular member, meeting the surface of the member at points on the vertical diametral plane spaced apart the diameter of the tubular member. The surfaces 15b will have an included angle less than 90 degrees, the exact angle depending on the radius of the arcuate section 15a.

Valve seat 18 has matching sealing surfaces for engagement with those of arcuate valve sealing member 15, developed in much the same manner except that the tangential surfaces are extended from a circular arc made through the horizontal diametral plane to the transverse end plane of a similar tubular member.

Tubular insert 17 has axial face surfaces developed in the same manner as the sealing surfaces of valve seat 18.

The extension of tubular insert 17 beyond valve seat 18 provides for an optional lip seal to be obtained between arcuate valve member 15 and tubular insert 17 as well as the face seals along the surfaces 15a and 15b. This extension also provides self centering of the arcuate valve sealing member on the valve seat as the result of symmetrical forces developed by reverse fluid flow at the time the valve sealing member passes the extension of tubular member 17.

Referring now to FIG. 3, the details of the support of arcuate valve sealing member 15 in valve body 10 are shown. Pivot pin 16 is supported within pivot housing 11 by closure members 19, which are provided with seals 20, since the interior of the housing is exposed to the pressure and fluid within the valve body. Spacers 21 serve to limit the transverse motion of hinge member 14 and attached arcuate sealing member 15, centering the sealing member on the valve seat. Screws 22 are shown for attachment of the hinge member to the arcuate sealing member but it will be appreciated by those skilled in the art that any other fastening method, such as welding, would serve the same purpose.

The valve described in the foregoing paragraphs uses gravity and/or the pressure exerted by fluid attempting to flow in the non-preferred direction to close the valve and obtain a seal between the mating sealing surfaces. In many applications of check valves, more positive sealing engagement is required, which may be provided by internal springs acting on the sealing member to provide a positive closing and sealing force. Referring to FIG. 4, the pivot housing is provided with housings 23 and closures 24 for receiving tension plates 25. Pivot shaft 27 supports left hand helical spring 28 and right hand helical spring 29 each having one end bearing on hinge member 14. The other ends of springs 28 and 29 are engaged with tension plates 25. In operation the tension plates are rotated until the desired tension has been applied to the springs and then secured in the desired position by screws 26.

Maintainance of check valves, once installed in the line requires repair and/or replacement of the moving elements and the sealing surfaces. In the present valve this may be accomplished as shown in FIG. 5, wherein the valve is provided with an access port 31 and access port closure 32 secured thereto by bolts 34. It will be recognized by those skilled in the art that access port 31 is also formable by making intersecting 45 degree cuts from a tubular member and intersecting 45 degree cuts from the valve body 10 and welding the two together, preserving one objective of this invention which is to produce a valve fabricatable solely from tubular elements. Pivot pin 16 is readily removable from pivot pin housing 11 by removing closures 19 at which point valve plate 15 and hinge member 14 can be removed through the access port 31, for replacement or repair of the sealing surfaces.

While an internal spring closure has been shown above in FIG. 4, it may not always be desirable to have springs and operating parts exposed to the fluid within the valve. The present invention adapts itself readily to external control of the arcuate valve sealing member as shown in FIG. 6. Here pivot housing 11 is provided with a packing gland 40, packing 41, and packing nut 42 for compressing the packing. An elongated pivot shaft 43 is extended beyond the pivot housing to provide means for external control of the sealing element. In this case, hinge element 14 is secured to pivot shaft 43 by screw 47, access to which is provided by plug 46.

Referring to FIG. 7A external control of the sealing element by means of a spring arm 52 secured to shaft 43 by collar 44 and screw 45. Spring 53 acting on spring arm 52, secured at the other end by a retainer 54, provides positive closure means for the valve sealing element 15.

In applications where flow is subject to sudden reversal or where pulsating flow conditions occur, as in the discharge of reciprocating pumps, it may be desireable to provide damping means for retarding the closure of the valve sealing element to prevent damage to the sealing surfaces. As hown in FIG. 7B, a damper 51 acting on arm 50 may be provided to retard the motion of the sealing element, the damper preferably being one which permits rapid initial movement of the valve sealing element toward the closed position and retards its motion just at the point of contact with the valve seat.

A third method of external control of the valve sealing element, by means of a counterweight 49 positionable on a shaft 48 is shown in FIG. 7C, biasing the valve sealing element trowards its closed position in engagement with the valve seat.

While I have shown all of the several embodiments of the present invention known to me, it is understood that other changes or modifications may be made by those skilled in the art and I desire not to be limited to the particular details shown but to cover all such modifications as may be encompassed by the scope of the following claims.

What is claimed is:

1. In a swing check valve having a body portion defining a fluid passage therethrough, a valve seat mounted in said body, a pivot member supported by said body, a pivotable sealing member rotatable around said pivot pin for engaging said valve seat for closure of the fluid passage when flow is in one direction and movement away from the valve seat when flow is in the opposite direction, the improvement comprising: said valve seat having non-planar sealing surfaces developed by forming a circular arc through the horizontal diametral plane of a tubular member and extending tangent planes from that arc to the periphery at the intersection of the vertical diametral and the transverse end planes of said member and said pivotable sealing member having an arcuate, saddle shaped configuration with non-planar sealing surfaces mating with those of the valve seat developed by forming a circular arc tangent to the horizontal diametral plane of a corresponding tubular member and extending tangent planes from that arc to the periphery of the member, meeting the periphery at points on the vertical diametral plane spaced apart the outer diameter of the tubular member.

2. An arcuate swing check valve comprising, in combination, a tubular valve body defining a fluid passage therethrough, a valve seat disposed in said valve body, further defining a portion of said fluid passage, said valve seat having non-planar sealing surfaces developed by making a circular arc cut through the horizontal diametral plane of said valve seat and extending tangential cuts from that arc to the intersection of the transverse end and vertical diametral planes of the seat, a transverse pivot housing on said body external to said fluid passage and connected thereto, pivot means in said housing for pivotally mounting an arcuate valve sealing member in said fluid passage for rotation between a closed position in engagement with said valve seat and an open position 90 degrees removed from said closed position, whereby said arcuate sealing member is in conformal configuration with the interior wall of said valve body and further defines a substantially cylindrical fluid passage with no restriction to flow through the valve or the passage of solid objects therethrough, said valve sealing member having a saddle shaped arcuate configuration and non-planar sealing surfaces developed by making a circular arc cut on the horizontal diametral plane of a tubular member corresponding to that of the valve seat and extending tangential cuts from that arc to the periphery of the member, meeting the surface at points on the vertical diametral plane spaced apart the diameter of the tubular member.

3. The valve of claim 2 wherein said pivot means comprises a fixed pivot pin and said arcuate valve sealing member is freely pivotable on said pivot pin.

4. The valve of claim 3 further comprising one or more helical springs supported by said pivot pin for engagement with said arcuate valve sealing member and forcing said arcuate valve sealing member into engagement with said valve seat.

5. The valve of claim 2 wherein said pivot means comprises a rotatable pivot shaft, said arcuate sealing member fastened to said pivot shaft and said pivot shaft having one or more ends extending from said pivot housing.

6. The valve of claim 5 further comprising an arm externally attached to said pivot shaft and a spring acting on said arm for forcing said arcuate valve sealing member into engagement with said valve seat.

7. The valve of claim 5 further comprising a lever arm externally attached to said pivot shaft and a damping device acting on said lever arm for retarding the sudden movement of said arcuate valve sealing member from the open position to the closed position when flow is reversed.

8. The valve of claim 5 further comprising an arm attached externally to said pivot shaft and a counterweight mounted on said arm for rotating said pivot shaft so as to cause said arcuate valve sealing member to engage said valve seat.

9. An arcuate swing check valve comprising, in combination, a tubular valve body defining a fluid passage therethrough, a tubular insert in said body, a valve seat retained in said body by said tubular insert further defining a portion of said fluid passage, said valve seat having non-planar sealing surfaces developed by making a circular arc cut through the horizontal diametral plane of a tubular member and extending tangential cuts from that arc to the periphery at the intersection of the trannverse end and vertical diametral planes, said tubular insert having internal face surfaces developed in the same manner as the sealing surfaces of the valve seat, the internal face surfaces extending axially beyond the sealing surfaces of the valve seat and congruent thereto, a transverse pivot housing on said body external to said fluid passage and connected thereto, pivot means in said housing for pivotally mounting an arcuate valve sealing member in said fluid passage for rotation between a closed position in engagement with said valve seat preventing flow through the valve in one direction and an open position 90 degrees apart from the closed position whereby said arcuate valve sealing member is in conformal configuration with the interior wall of said valve body and defines a substantially cylindrical fluid passage with no restriction to fluid flow or to the passage of solid objects through the valve, said arcuate sealing member having a saddle shaped, arcuate configuration and non-planar sealing surfaces developed by making a circular arc cut on the horizontal diametral plane of a tubular member corresponding to that of the valve seat and extending tangential cuts from that arc to the periphery of the member, meeting the surface at points on the vertical diametral plane spaced apart the diameter of the tubular member.

10. The valve of claim 9 wherein the arcuate valve sealing member makes a face seal with the valve seat and a peripheral lip seal with the axially extended inner wall of said tubular insert.

11. The valve of claim 9 wherein said pivot means comprises a fixed pivot pin and said arcuate valve sealing member is freely pivotable on said pivot pin.

12. The valve of claim 11 further comprising one or more helical springs supported by said pivot pin for engagement with said arcuate valve sealing member and forcing said sealing member into engagement with said valve seat.

13. The valve of claim 9 wherein said pivot means comprises a rotatable pivot shaft, said arcuate valve sealing member secured to said shaft, and said pivot shaft having one or more ends extending from said pivot housing.

14. The valve of claim 12 further comprising an arm externally attached to said pivot shaft and a spring acting on said arm for forcing said arcuate valve sealing member into engagement with said valve seat.

15. The valve of claim 12 further comprising an arm externally attached to said pivot shaft and a damping device acting on said arm for retarding the sudden movement of said arcuate valve sealing member from the open position to the closed position when flow is reversed.

16. The valve of claim 12 further comprising an arm externally attached to said pivot shaft and a counterweight mounted on said arm for rotating said pivot shaft so as to cause said valve sealing member to engage said valve seat.

* * * * *